Oct. 21, 1969     L. J. SEABERG     3,473,506
STRIP RETRIEVAL APPARATUS WITH MOVABLE SCALE
Filed May 22, 1967     6 Sheets-Sheet 1

LEONARD J. SEABERG
INVENTOR.

BY
ATTORNEYS

Oct. 21, 1969  L. J. SEABERG  3,473,506
STRIP RETRIEVAL APPARATUS WITH MOVABLE SCALE
Filed May 22, 1967  6 Sheets-Sheet 3

LEONARD J. SEABERG
INVENTOR.

BY John D. Husser
Robert W. Hampton
ATTORNEYS

Oct. 21, 1969

L. J. SEABERG 3,473,506

STRIP RETRIEVAL APPARATUS WITH MOVABLE SCALE

Filed May 22, 1967

LEONARD J. SEABERG
INVENTOR

BY *John W. Hussey*
*Robert W. Hampton*
ATTORNEYS

Oct. 21, 1969 L. J. SEABERG 3,473,506
STRIP RETRIEVAL APPARATUS WITH MOVABLE SCALE
Filed May 22, 1967 6 Sheets-Sheet 5

LEONARD J. SEABERG
INVENTOR.

BY
ATTORNEYS

Oct. 21, 1969   L. J. SEABERG   3,473,506
STRIP RETRIEVAL APPARATUS WITH MOVABLE SCALE
Filed May 22, 1967   6 Sheets-Sheet 6

LEONARD J. SEABERG
INVENTOR.

BY
ATTORNEYS 3,473,506
STRIP RETRIEVAL APPARATUS WITH
MOVABLE SCALE
Leonard J. Seaberg, Rochester, N.Y., assignor to Eastman Kodak Company, Rochester, N.Y., a corporation of New Jersey
Filed May 22, 1967, Ser. No. 640,178
Int. Cl. G09f 9/00; G06k 7/00
U.S. Cl. 116—124                                             6 Claims

ABSTRACT OF THE DISCLOSURE

A scale for facilitating the positioning of particular information areas on various selected strips of a multiple-strip file. The scale is operatively connected to the selection mechanism of a device for retrieving and positioning predetermined file strips in a manner such that selecting movement of the selection mechanism orients the scale so as to indicate the position of particular information areas with respect to an operational station.

CROSS REFERENCE TO RELATED APPLICATIONS

Reference is made to commonly assigned U.S. patent application Ser. No. 486,725, now abandoned, entitled Strip Retrieval Device, filed Sept. 13, 1965, in the name of Donald R. Schneeberger and Leonard J. Seaberg, upon which a continuation application Ser. No. 708,419 was filed Feb. 26, 1968.

BACKGROUND OF INVENTION

The present invention relates to the retrieval of recorded information and, more particularly, to an improved apparatus of the type used for selecting and positioning in an information-retrieval plane, a predetermined strip from a file of similar information-bearing strips, which apparatus includes a movable scale adapted for locating particular information areas on the predetermined file strip in an operational station along the information-retrieval plane.

Apparatus has recently been developed for retrieving predetermined strips from information files of the type comprising a plurality of information-bearing strips which are secured together at one end for movement as a unit and have the other ends arranged in a shingled array. Such a retrieval apparatus is disclosed in the above-identified U.S. patent application in the name of Donald R. Schneeberger et al. In apparatus of this type, the file is engaged and moved as a unit to separate the selected strip from the remainder of the file and thereafter to move that strip past an operational station in an information-retrieval plane.

Because the leading strip ends of multiple-strip information files of this type are arranged in a shingled array to facilitate the strip selection operation, difficulties have heretofore existed in providing a common index means suitable for selectively positioning in the information-retrieval station predetermined information areas on all of the selected strips in the file.

In order to permit use of a common scale for all file strips, the first information areas on the various file strips, i.e., the information area closest to the leading strip end included in the shingled array, hereinafter called $I_1$, can be spaced rearwardly from the leading end at incrementally increasing distances so as to compensate for the staggered relation of the leading strip ends. Such compensating spacing will allow the first information area, $I_1$, on each of the strips to be located in superimposed relation in the file. A fixed scale, adjacent to the file, can then be used in conjunction with an index connected to the file-advancing means to reflect the advance of a selected strip in the retrieval plane and thereby facilitate positioning particular information areas on any of the file strips with respect to the operational station. Such a solution to the problem of locating particular information areas on each strip, however, involves special preparation procedures for each of the file strips and results in the loss of information space at the leading ends of strips in the file.

If the first information areas $I_1$ on each strip are not prepared in a superimposed relation in the file, a fixed scale operating in conjunction with the means for moving the file cannot be used to position selectively the information areas on each strip in the file, for the position of file advance which would place an information area $I_1$ of one strip in the operational station on one strip would not so locate $I_1$ of the other strips.

SUMMARY OF INVENTION

It has therefore been devised to provide a scale which is synchronously movable with the strip selection mechanism of the strip retrieval apparatus in a predetermined relation such that corresponding information areas of the various strips in the file, e.g., information areas $I_1$, can be arranged in a staggered relation yet selectively located by a common scale and an index on the file-moving means in the same manner as if the corresponding information areas were superimposed. To accomplish this purpose, the movable scale of the present invention has been connected to selection means of the apparatus in a manner such that the selection of a certain strip in the file moves the scale to a position where a pointer connected to the file-moving means will correctly reflect, on the scale, the particular information area on the selected strip which is in an operational station along the retrieval plane, such as, e.g., an information-retrieval station.

While the invention is described hereinafter with respect to moving a selected film strip into the focal plane of a projection lens system for projecting one of a number of images thereon onto a screen or a photographic paper, the strips can be of paper having photographic images thereon that can be projected by a light-reflection system rather than a light-transmitting system. Also, the strips can be made of paper with encoded information punched therein, or can be a magnetic tape with magnetically recorded information. In the latter instances, after strip selection and positioning, a selected strip or tape can be automatically driven at the proper speed past a punch to encode the tape, a scanning device to read the tape, or a record/play head, any one of which can, in effect, be considered as defining an operational station in the information-retrieval plane analogous to the focal plane of a projection-lens system. It will also be appreciated that information areas on the strip may be devoid of information when the file is constructed and thereafter have information added at the operational station. Further, the operational station can be one which updates the strip by removing old information and adding new information to particular information areas on the strip.

It is therefore an object of the present invention to provide improved apparatus for selectively positioning at an operational station predetermined information areas of a multiple-strip information file.

Another object of the present invention is to provide an improved apparatus for selecting one of a number of strips for movement through an information-retrieval plane and for selectively positioning predetermined areas on that strip with respect to an operational station located along that plane.

Still another object of the invention is to provide apparatus that is easy to operate and simple in structure for separating from a multiple-strip file, and selectively positioning, one of a number of information-bearing strips.

Further objects and advantages of the present invention will become readily apparent to those skilled in the art from the following description, when read in conjunction with the accompanying drawings in which like characters represent like parts.

DESCRIPTION OF PREFERRED EMBODIMENTS

Figures 1, 2, 3:
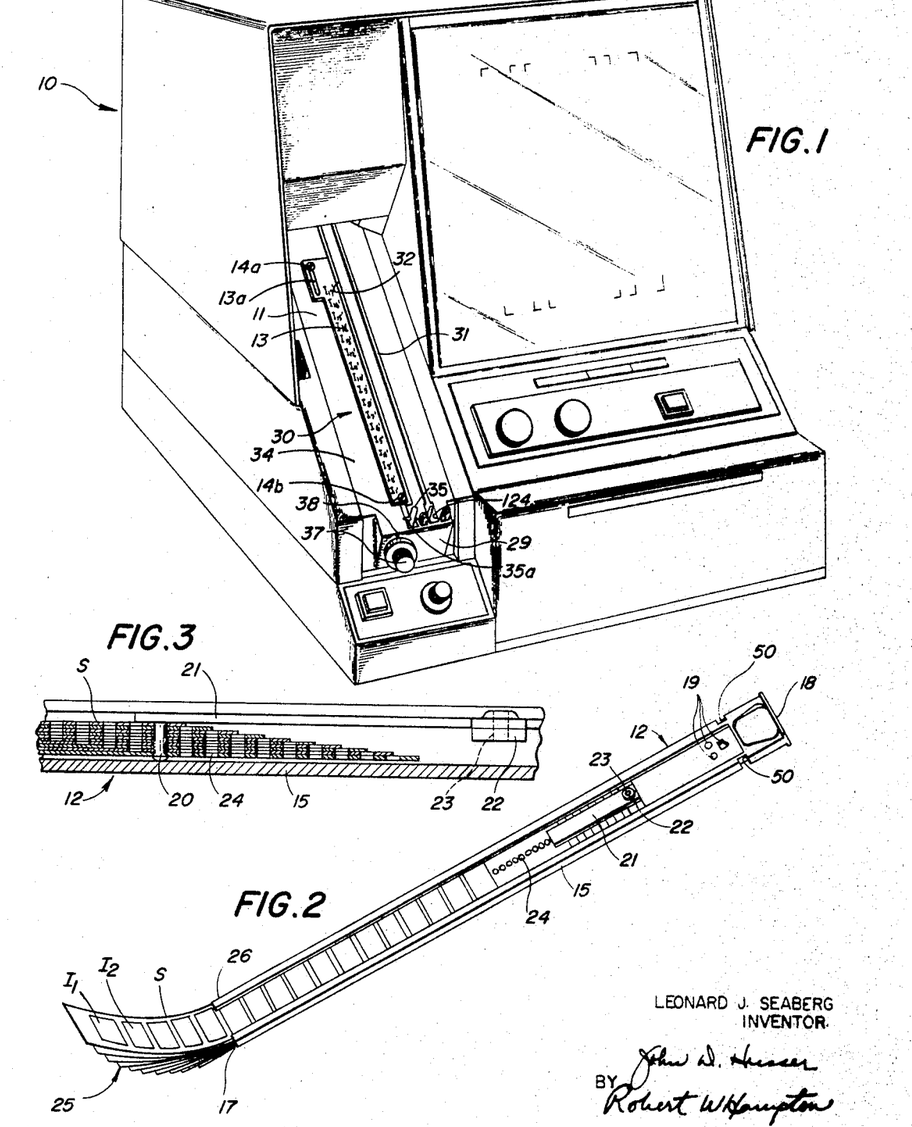
FIG. 1 is a perspective view of a reader-printer incorporating the invention.
FIG. 2 is a detailed perspective view showing a holder and the manner in which a multiple-strip file is desirably retained therein.
FIG. 3 is a partial longitudinal section through the holder shown in FIG. 1, showing the manner in which the strips are mounted for arranging the free ends in a shingled array.

In FIG. 1 a reader-printer 10 is shown in which a support means 11 for a holder 12 is arranged to the left of a viewing screen on the reader-printer. In such a reader-printer 10 a portion of a film strip, that is, one of the images thereon, is positioned in the focal plane of a projection-lens system and, by a system of mirrors, the image is directed onto a screen, or onto a photographic paper that is arranged within the reader-printer 10 for making a copy thereof. Inasmuch as such reader-printers are known in the art and can be similar in structure to that disclosed in U.S. Patent 3,161,105, it is believed that no further description or disclosure thereof is necessary.

With reference to FIG. 2, the holder 12 comprises a channel portion 15 for receiving a number of film strips S that can be slidably mounted in channel portion 15 for movement as a unit through an open end 17 thereof. The holder 12 includes a handle portion 18 to facilitate handling and positioning of the holder on the support means 11 or in a suitable file. At the end of channel portion 15 adjacent to tthe handle 18, spaced protuberances 19 are provided for a purpose to be described. A pin 20 extends from one side of a guide member 21, and a button 22 that is spaced from the pin 20, see FIG. 3, extends from the opposite side of the guide member 21, the button 22 having a central hole 23. Each of the strips S is provided at one end with a group of longitudinally spaced holes 24 for engaging the pin 20. When a number of strips S are assembled on guide member 21 for retention within holder 12, each successive strips is positioned on the pin 20 with a correspondingly numbered hole 24 in engagement therewith. By this arrangement the strips S are effectively joined together at one end by the pin 20 so as to be movable as a unit, as shown in FIG. 3, and the ends 25 adjacent to the open end 17 are arranged in a shingled array because of their arrangement on pin 20, as shown in FIG. 2. When the strips S are completely withdrawn into the holder 12, the button 22 is engaged by the protuberances 19, thereby retaining the strips in holder 12. The sides of holder 12 at the end 26 adjacent to open end 17 are tapered for a purpose to be described hereinafter.

In FIG. 2 it can be seen that discrete information areas $I_1$, $I_2$, etc. are uniform in size and are uniformly spaced along the topmost strips. The information areas are formed and spaced along the other strips of the file in the same manner. It will also be noted in FIG. 2 that the first information area, $I_1$, of the topmost strips in the file is positioned to the left of the first information area on the strips adjacent thereto. This staggered relation occurs with respect to each of the respective first information areas of the strips in the file and, in a like manner, with respect to the subsequent information areas $I_2$, $I_3$, etc. of the file strips so that corresponding information areas are not in superimposed relation within the file.

Figure 4:
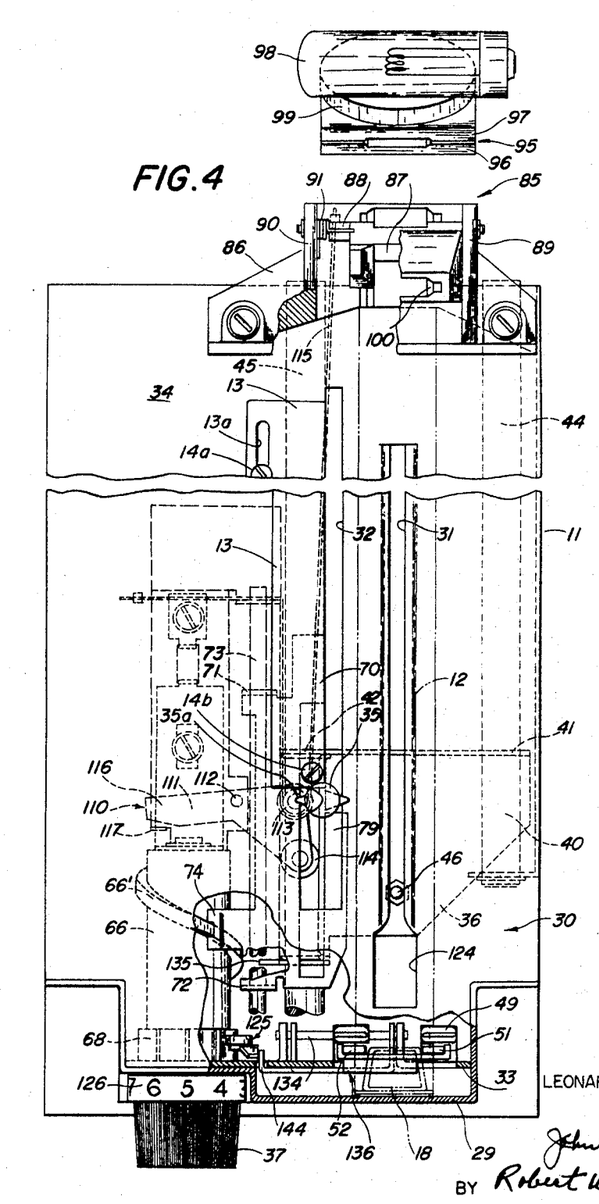
FIG. 4 is a plan view of the support plate for the present invention having a central portion broken away and disclosing the movable scale as it cooperates with the strip-selection mechanism in the reader-printer shown in FIG. 1.
Figure 6:
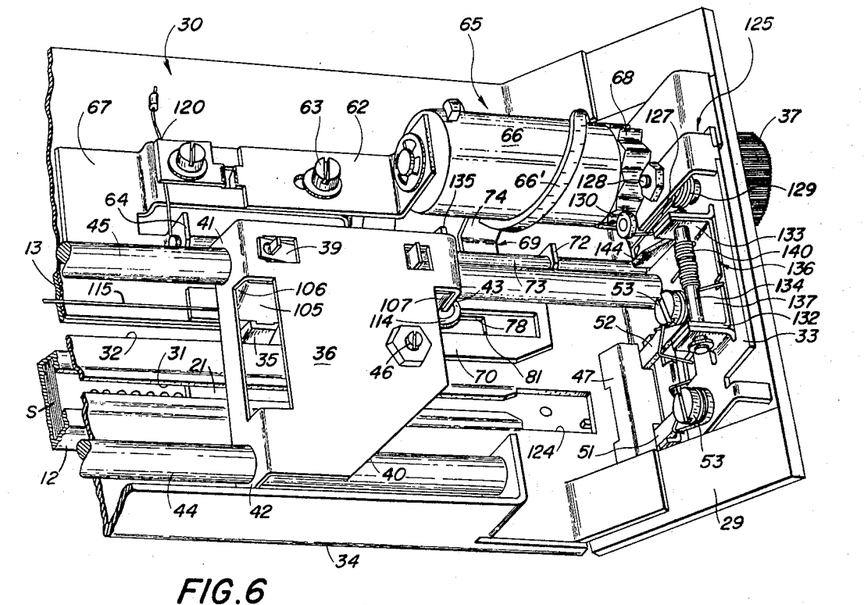
FIG. 6 is a partial perspective view of the bottom of the support plate shown in FIG. 5.

The support means 11 for the file comprises a plate 30 having longitudinal slots 31 and 32 which terminate adjacent to a front face 33 of the plate 30, the plate 30 being formed at the front face 33 to support a panel 29 at an angle to the top surface 34, see FIGS. 4 and 6. The plate 30, with the mechanisms to be described, is secured to the front of the reader-printer 10 at an angle substantially as shown in FIG. 1. The slot 31 permits a connection to be made, by means of the button 22, between the strips S and a strip-advancing mechanism when the holder 12 is positioned on the plate 30. The slot 32 provides a path of movement for an operating member 35 that is coupled to an advancing means 36. A selecting knob 37 is rotatably mounted on the front panel 29 for movement relative to a fixed index 38 (see FIG. 1) to facilitate the selection of one of strips S for movement into an information-retrieval plane 95 by operating member 35.

Figure 5:
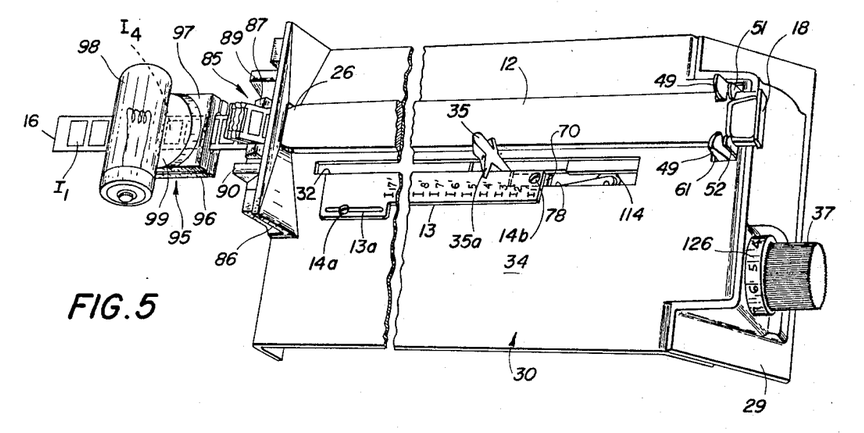
FIG. 5 is a perspective view of the support plate with a holder positioned thereon, having a center section broken away and further showing the cooperation between the file-advancing means and the movable scale.

As can be seen in FIGS. 1 and 5, a scale 13 is slidably supported on plate 30 adjacent to one edge of slot 32 by screws 14a and 14b. The scale 13 slidably engages screw 14a in an elongated notch 13a and is connected to a plate 70 (see FIG. 4) which extends beneath the plate 30, by screw 14b for movement with plate 70 in a manner hereinafter to be described in detail. As also can be seen in FIG. 1, the operating member 35 includes a pointer 35a extending therefrom above the scale 13 in a manner which facilitates indexing of operating the movement of member 35 with respect to graduations on scale 13.

Figure 7:
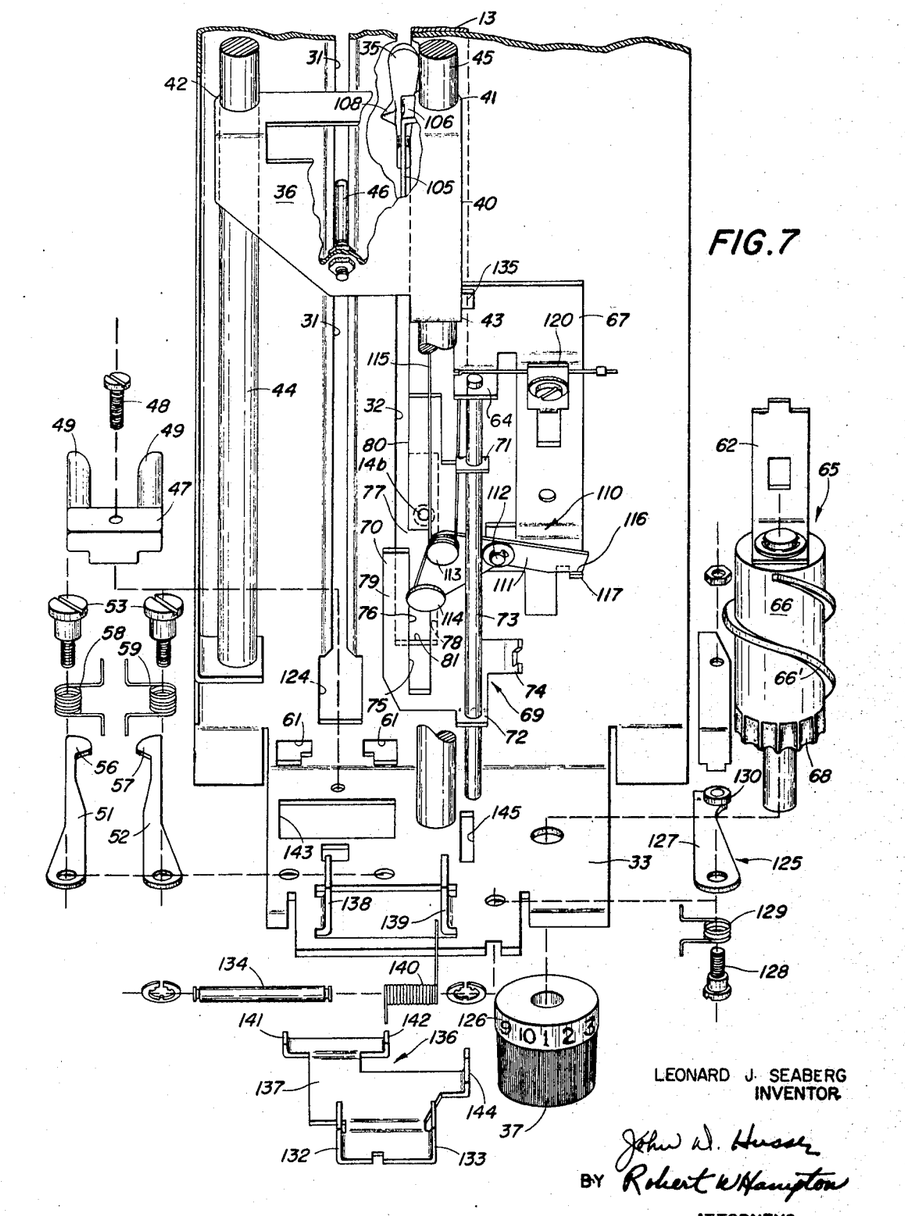
FIG. 7 is a view of the underside of the support plate with various parts shown in an exploded relation for detail and clarity.
Figure 8:
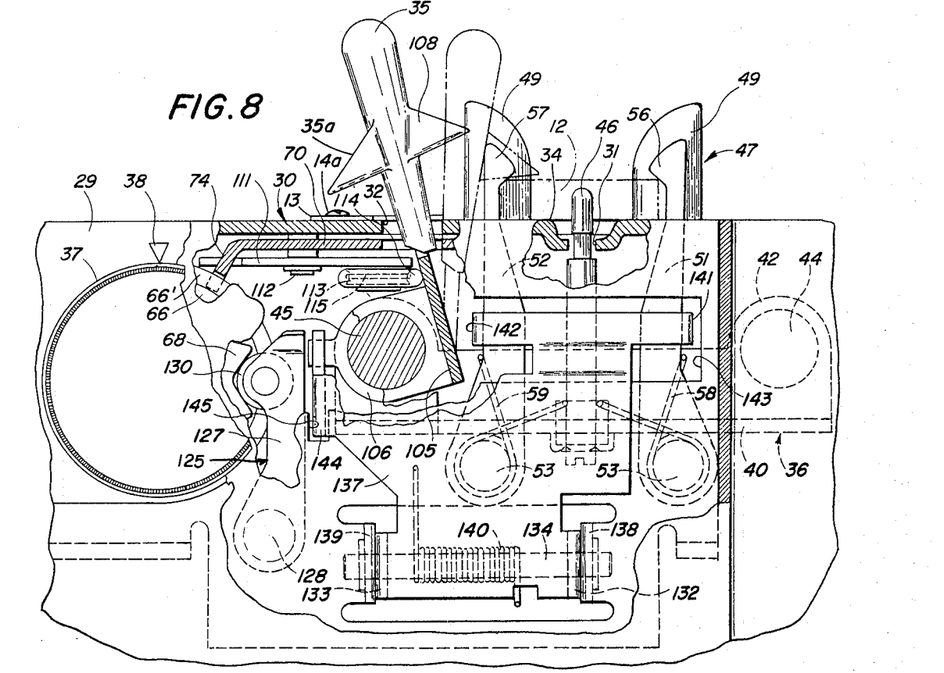
FIG. 8 is an enlarged end elevational view of the support plate and the mechanisms thereon with a portion of the front face broken away to show the operating member and interlock means.

With reference particularly to FIGS. 4, 6 and 8, the advancing means 36 comprises a bracket 40 having spaced ears 41, 42 and 43 which slidably engage a pair of spaced rods 44, 45 that are mounted on the underside of plate 30, a leaf spring 39 carried by bracket 40 and engaging rod 45 to provide a frictional drag so the bracket 40 can be positioned along the rods 44 and 45 without slippage, see FIG. 6. Bracket 40 carries a pin 46 which extends into slot 31, as shown in FIG. 8, for engaging the hole 23 in button 22 when the holder 12 is positioned on plate 30. A locating member 47 is secured to the inside of face 33 by a screw 48 (see FIG. 7) and is provided with a pair of spaced projections 49 that extend through a pair of spaced apertures 61 (see FIG. 5) in plate 30 for locating the holder 12 by engaging a pair of notches 50, one of which is located in each edge of the holder adjacent to handle 18, as shown in FIG. 2. A pair of holding members 51, 52, each of which is pivotally mounted on the inside surface of face 33 by means of a threaded stud 53, also extend through a respective one of apertures 61 so that noses 56, 57 thereof can engage the top surface of the holder 12 to hold the latter on the plate 30. As described hereinafter, removal of the holder 12 is prevented during movement of the advancing means 36 by means that coact with the members 51 and 52, which are normally biased toward the holder 12 by their respective springs 58 and 59.

Selecting means 65 comprises cylindrical member 66 having a helical-ridge cam 66', the member 66 being rotatably mounted between the face 33 and an angle plate 62 that is secured by a screw 63 to a bracket 67, which, in turn, is secured to the underside of plate 30, see FIGS. 6 and 7. At its forward end, the member 66 is provided with a fluted ring 68 having a number of flutes corresponding to the maximum number of strips S to be contained in a holder 12. The selecting knob 37 is secured to the member 66 by a pin or key, not shown, so that rotation of the knob 37 is imparted to the member 66 and the fluted ring 68.

Control means 69 comprises the plate 70 which has spaced ears 71, 72 that slidably engage a rod 73 mounted on the underside of plate 30 between an ear 64 on bracket 67 and face 33, as best seen in FIGS. 6 and 7. The plate 70 is provided with a bifurcated extension 74 which engages the helical cam 66' that moves the plate 70 along rod 73 when knob 37 is rotated. The plate 70 is provided with a right-angled cut-out 75 that forms a first path 76 and a second path 77 for the member 35. With reference to FIG. 7, it will be noted that a leg 79 of plate 70 covers part of an enlarged portion 78 of the slot 32 and that another part of plate 70 which also overlies portion 78 is connected to scale 13 by screw 14b. Beyond cut-out 75, an edge 80 of plate 70 is aligned with the right-hand edge of slot 32. Since plate 70 lies relatively close to the undersurface of plate 30, the cut-out 75, in conjunction with slot 32, provides a path in which the member 35 is movable, namely, a first path 76, a second path 77 which connects the path 76 to slot 32, and a third path that is defined by slot 32. Upon rotation of selecting knob 37, the cam 66' moves plate 70 relative to portion 78 and slot 32 so that the length of the first path 76, as measured from an end 81 of portion 78 to the second path 77 corresponds to the distance required to move a selected strip 16 from within the holder 12 to a position relative to a separator means 85 (see FIGS. 4 and 5).

Since the scale 13 is fixed to plate 70 and slidably mounted along an edge of slot 32, the movement of the strip-selecting knob 37 effects a displacement of scale 13 which corresponds to the distance which the strip file is moved for purpose of strip selection.

Figure 9:
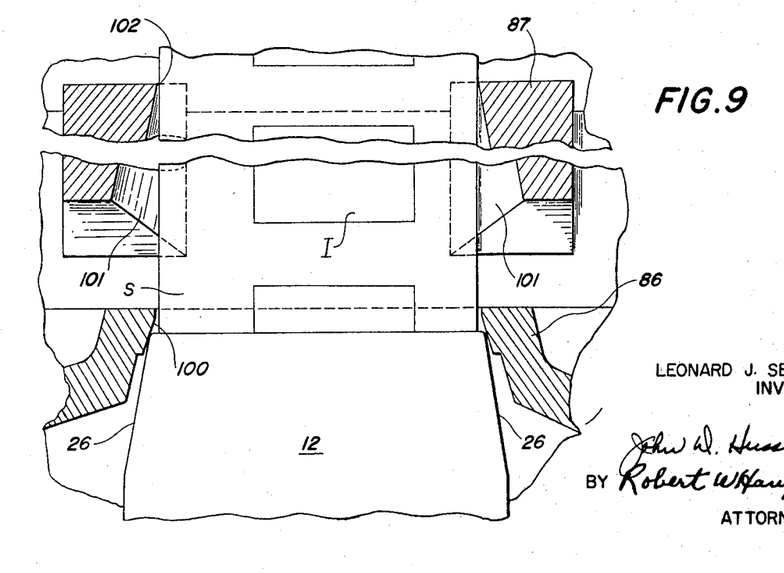
FIG. 9 is a partial horizontal, sectional view through the separator means showing the means for locating the holder and strip file relative thereto.
Figures 10, 11:
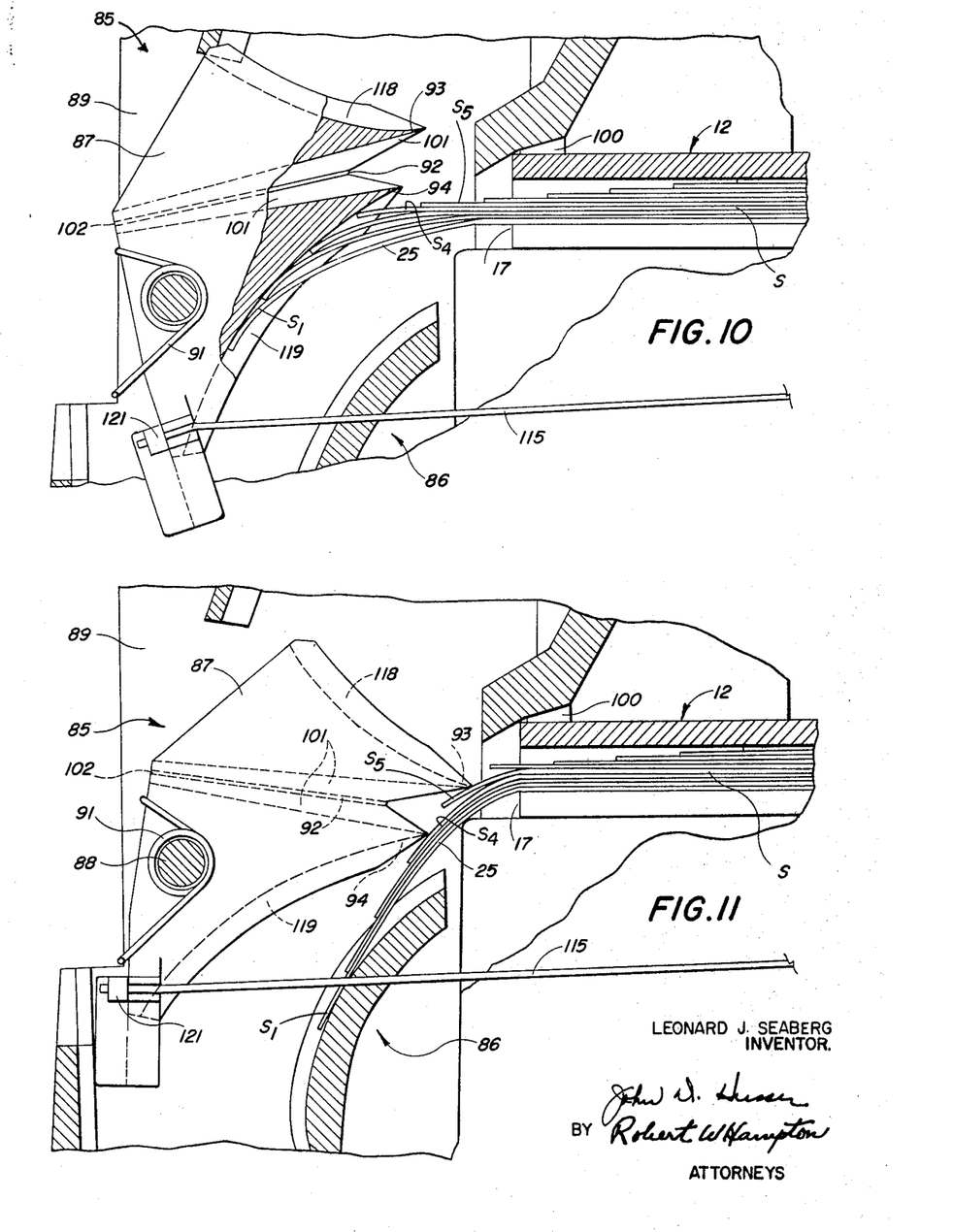
FIGS. 10 and 11 are enlarged vertical, sectional views through the separator means showing, respectively, its relation to the ends of the strips in a selecting position and in a separating position.

Separator means 85 is pivotally mounted on the rear end of plate 30 by means of a bracket 86, see FIGS. 4, 5, 10 and 11. The separator means 85 comprises a member 87 that is pivotally mounted on a rod 88 that is journaled in a pair of spaced uprights 89, 90 on bracket 86. A coil spring 91 on rod 88 engages member 87 to urge it in a clockwise direction, but it is retained in a position as shown in FIG. 10 by means described in detail hereinafter. The member 87 is provided with a central opening 92 which, at the right-hand end, as seen in FIGS. 10 and 11, terminates in a pair of spaced lips 93, 94 which serve to separate a selected strip 16 (see FIG. 5) from the group that is contained in the holder 12. The bracket 86 is provided at the forward end with a tapered throat 100, as seen in FIG. 9, which engages the tapered end 26 of the holder 12 to locate the latter when it is positioned on plate 30. Likewise, the opening 92 in member 87 is beveled outwardly, as at 101, and also tapered to the rear to provide a rear aperture 102 which accurately locates the free end of the selected strip 16 for movement between a pair of spaced optical flats 96, 97.

The separator means 85 is arranged between the open end 17 of the holder 12 and the information-retrieval plane or operational station designated by the numeral 95, see FIGS. 4 and 5. In the apparatus in combination with which the present invention is being described, the information-retrieval plane 95 is the focal plane of a projection lens system that is not shown. The plane 95 is determined by the pair of optical flats 96, 97 between which the selected strip 16 is moved for positioning one of the images I thereon in registry with the optical axis of the lens system. The image is illuminated by a light source 98 and a suitable condenser lens system 99, in a manner as is well known in the art.

The operating member 35 which extends through slot 32 is fastened to a bracket 105 that is pivotally mounted on rod 45. Bracket 105 is provided with spaced ears 106, 107 which are arranged between and in contact with ears 41 and 43 of bracket 40, see FIGS. 6, 7 and 8. Upon movement of the member 35 in either direction through paths 76, 77 and slot 32, the advancing means 36 is moved therewith, and by means of pin 46, the bracket 40 and the strip S are also moved into and out of holder 12. The member 35 is also provided with a nose 108 that engages the holder 12 when the member 35 enters slot 32 for maintaining holder 12 against surface 34, see FIG. 8.

Actuating means 110 comprises a lever 111 which is pivotally mounted on bracket 67 at 112, see FIGS. 7 and 8. The lever 111 carries a pulley 113 and a freely rotatable roller 114 that normally engages the bracket 105, see FIG. 8. The pulley 113 is encircled by a cable 115 which has one end fixed to bracket 67 at 120, see FIG. 7, and the other end fixed to member 87 at 121, see FIGS. 10 and 11. With this arrangement, the position of member 87 is controlled by the position of pulley 113. Due to the spring 91 urging the member 87 in a clockwise direction, member 87 is held in the position shown in FIG. 10 so long as the pulley 113 is at its farthest distance from the member 87. This distance is decreased when lever 111 rotates in a counterclockwise direction, as viewed in FIG. 4, and spring 91 then moves member 87 into the position shown in FIG. 11. Whenever operating member 35 is in the first path 76, roller 114 is in engagement with bracket 105 and urges operating member 35 in a clockwise direction, as seen in FIG. 8, and against the edge of a cut-out 75, as seen in FIG. 7, due to the action of spring 91 through cable 115. When operating member 35 is moved along path 76 to a position opposite the second path 77, level 111 is moved in a clockwise direction as seen in FIG. 7 by spring 91 and urges bracket 105 and operating member 35 in a clockwise direction as seen in FIG. 8 so that the operating member 35 is moved through the second path 77 into slot 32. The movement of lever 111 is arrested by an end 116 thereof engaging a stop lug 117 on bracket 67.

With this movement of lever 111, a shorter distance is established between pulley 113 and member 87 so that the spring 91 moves the member 87 in a clockwise direction to the position shown in FIG. 11. During this movement of member 87, the lip 93 engages a surface of the selected strip $S_5$ whereas the lip 94 engages a surface of the next and immediately adjacent strip $S_4$. The member 87 is provided with guide surfaces 118 and 119 for directing the unselected strips above and below the selected strip $S_5$ into paths that diverge and are different from that of the selected strip $S_5$. As will be more fully described hereafter, if the first or the last strip in a group is the one to be selected, all of the remaining or unselected strips are then directed in only one direction.

A detent device 125, see FIGS. 7 and 8, is provided for engaging the fluted ring 68 to hold the control means 69 and the scale 13 in a fixed position relative to slot 32 in accordance with the selected strip during the separation thereof and the movement of the strips S into and out of holder 12. As stated above, the number of flutes in ring 68 corresponds to a number scale 126 provided on knob 37 and to the maximum number of strips S that can be contained in a holder 12. In order to make a selection, it is necessary that the advancing means 36 be positioned in a "home" or selecting position which is immediately adjacent to the front face 33 of plate 30 with the pin 46 in an enlarged end portion 124 of slot 31. The detent device 125 comprises a lever 127 that is pivotally mounted on the inner side of face 33 by means of a threaded stud 128, and carries a roller 130 that is urged against the fluted ring 68 by a spring 129 so that the roller 130 can ride in an out of the flutes.

In the "home" position of the advancing means 36, an extension 135 on bracket 40 engages an interlock device 136, see FIGS. 6–8, which comprises a plate 137 that is pivotally mounted by means of a pair of spaced ears 132, 133 on a rod 134 that is journaled in a pair of spaced supports 138–9 formed inwardly from the face 33, the plate 137 being urged toward the advancing means 36 by a spring 140 on rod 134. A pair of spaced lugs 141, 142 extend through an opening 143 in face 33 to engage the holding members 51 and 52. A lug 144 that extends through an opening 145 in face 33 is positioned in the path of extension 135. When the bracket 40 is in the "home" or selecting position, the extension 135 is in engagement with the lug 144 and urges the plate 137 in a direction such that lug 144 is free of detent device 125 and lugs 141, 142 are retracted from members 51 and 52.

In order to understand the operation of the invention and co-operating relationship of the various parts and mechanisms included therein, it is believed best to describe a complete selection operation now that the individual elements and mechanisms have been identified. As stated above, in order to make a selection, the advancing means 36 must be in a "home" or selecting position with bracket 40 adjacent to the front face 33 so that the extension 135 is holding the interlock device 136 in a position such that the detent device 125 and the holding members 51 and 52 are free. A holder 12 is positioned on plate 30 with the open end 17 positioned in the throat 100 adjacent to the separator means 85. The holder 12 is positioned with the open face thereof facing plate 30 and with the guide member 21 positioned so that protuberance 19 are engaging button 22, that is, with the strips S entirely contained within holder 12. When the holder 12 is positioned on the surface 34 of plate 30, the projections 49 on member 47 engage the notches 50, and the holding members 51, 52 are spread apart and then return to a position in which the noses 56 and 57 engage the holder in the vicinity of handle 18, see FIG. 5. When the holder 12 is so positioned on plate 30, the button 22 engages the pin 46 on bracket 40.

After the holder 12 has been so positioned and since the interlock device 136 is still in a position so that it is not blocking the detent device 125, knob 37 can be rotated to make a selection. It should be pointed out at this point that it is not necessary for the knob 37 to be in a zero or any other predetermined position to make a selection. As will be apparent from the description which follows, knob 37 can be rotated in either direction within the limits of travel irrespective of any previous selection that may have been made. Upon rotating knob 37 in either direction, cam 66′ through follower extension 74 moves plate 70 and scale 13 along slot 32 so as to position the second path 77 and graduations on scale 13 relative to slot 32. At this time, operating member 35 is at the front end 81 of enlarged portion 78 adjacent to face 33. The second path 77 is therefore located by knob 37 relative to slot 32 in accordance with the distance of the selected strip 16 within the holder 12 from the separator means 85. As can be seen best in FIG. 5, the scale 13 is synchronously moved a corresponding distance.

Operating member 35 is then moved through the first path 76 until it abuts the end thereof and then is opposite the second path 77. As the operating member 35 is first moved along path 76, extension 135 is removed from extension 144 and the interlock device 136 then becomes operative. With further movement of operating member 35, spring 140 urges the plate 137 into a position in which lugs 141 and 142 engage holding members 51 and 52, respectively, to prevent their being moved or spread in a direction so as to remove the holder 12. Also, the lug 144 then assumes a position alongside lever 127 so that the roller 130 is held in the flute corresponding to the selected strip number, thereby inhibiting rotation of selecting knob 37.

When operating member 35 is aligned with the second path 77, the actuating means 110 moves the operating member 35 through the second path 77 and into slot 32. As this occurs, the roller 114 follows bracket 105, lever 111 moves in a counterclockwise direction (FIG. 4) and pulley 113 moves toward the separator means 85 due to spring 91 so that member 87 can then move toward the film strips S. Also, the nose 108 engages the holder 12 to hold it against surface 34 as member 35 is moved along slot 32. As member 35 is moved in the first path 76, the bracket 40 is moved therewith, and, since the strips S are engaged by the pin 46 by means of button 22, the strips S are moved as a unit towards separating means 85. Movement of the strips S is temporarily halted as operating member 35 moves through the second path 77 and into slot 32.

Since the operating member 35 is, in effect, controlling separation of the selected strip 16, the separation is actually made during the interval in which the operating member 35 moves from the first path 76 through the second path 77 and into slot 32. When the member 87 is urged in a clockwise direction by spring 91, the lips 93, 94 automatically perform the separating operation. Then, upon further movement of the operating member 35 along the slot 32, the selected strip 16 is moved through opening 92 and between the optical flats 96, 97 while the unselected strips are moved along guide surfaces 118 and/or 119 depending on the number of the selected strip.

After the operating member 35 has been moved through the second path 77 and into slot 32, a pointer 35a thereon extends over the scale 13, as best seen in FIG. 5. By appropriately locating the graduations on scale 13 the pointer 35a will be opposite graduation $I_1'$ when information $I_1$ is in the operational station, etc. Because of the displacement of scale 13 during strip selection, this relationship will be the same for all strips of similar format in the file. The operating member 35 can therefore be moved along slot 32 until the pointer 35a extends over the graduation on the scale which corresponds to the desired information area. As shown in FIG. 5, the pointer 35a is over graduation $I_4'$, and information area $I_4$ of the selected strip, $S_5$, is positioned in the information retrieval station. The operating member 35 can be moved back and forth along the scale 13 to position selectively the selected strip 16 in the information-retrieval plane 95 and thereby locate any one of the images I on that strip with respect to the axis of the optical system.

When the direction of movement of the operating member 35 is reversed to return the strips to the holder 12, the member 35 is moved along slot 32 until it abuts the end of leg 79. The operating member 35 must then be urged through the second path 77, and, as this is done, the roller 114 is engaged by bracket 105, thereby pivoting the lever 111 in a clockwise direction (FIG. 4) and increasing the distance between the member 87 and the pulley 113 so that the member 87 is returned to the position shown in FIG. 10. The strips S are then completely returned within the holder 12 as the operating member 35 is moved along the first path 76 toward edge 81. As the operating member 35 approaches the end of the first path 76, the extension 135 on plate 40 engages lug 144 on plate 137, thereby pivoting the interlocking device 136 so that the detent device 125 and the holding members 51, 52 are free to be moved. With the strips S returned to the holder 12 and the detent device 125 free, another strip can be selected merely by rotating the knob 37 in either direction until the proper number on scale 126 is aligned with index 38. To remove the holder 12, the holding members 51, 52 are urged apart and the holder 12 raised by means of the handle portion 18 for withdrawal from the pin 46 and the plate 30.

It will be appreciated that, since the scale 13 is moved during the strip-selection operation a distance which corresponds to the advance of the selected strip before separation, the scale 13 will be correctly positioned to index the information areas on any strip S in the file. It is, of course, understood that the format of the strips S in the file, i.e., the relative location of information areas, must be substantially the same for a similarly formated scale to be useful for more than one strip. Several movable scales could, however, be provided to accommodate files with strips of several formats. Further, the movable scale can be constructed so that the format of graduations is readily changeable to correspond to the format of particular files, as, for example, by making the graduations erasable. The scale can also be made easily removable so that scales with format corresponding to the particular file used can be easily attached.

From the above description of the invention, it can be seen that the selection of a strip S, as well as its movement through the information-retrieval plane 95, is accomplished manually by the operator. However, when strips S are paper or are lengths of magnetic tapes, the advancing means 36 can be coupled to a motor drive as operating member 35 moves into slot 32 so that the strips or tapes can then be moved at the requisite speed for recording information on, or retrieving information from, the selected strip or tape as it is moved past a punch mechanism, a scanning means, or a record/play head. By means of directional and limitation controls, the motor drive can be reversed for returning the strips into the holder 12 upon completion of each recording or retrieving operation.

The invention has been described in detail with particular reference to preferred embodiments thereof, but it will be understood that variations and modifications can be effected within the spirit and scope of the invention.

I claim:
1. Apparatus for receiving an information file of the type comprising a number of strips which are secured together at one end for movement as a unit and have the other ends arranged in a shingled array and for selectively separating one strip in the file from the other strips in the file and positioning a predetermined information area of the selected strip in an information-retrieval position with respect to an operational station, said apparatus comprising:
   (a) support means for receiving the file including means defining a predetermined path of movement for the file;
   (b) separator means for selectively separating any one strip in the file from the remaining strips in the file and for directing the selected strip toward the operational station;
   (c) operating means for moving the file along said predetermined path into cooperative relation with said separator means, for effecting the separation of the selected strip by said separator means, and for moving the selected strip to the information-retrieval position;
   (d) strip selection means for controlling the position of the file with respect to said separator means at which strip selection is effected; and
   (e) scale means which are movable with respect to said predetermined path in response to operation of said strip selection means for indicating, in cooperation with said operating means, the particular information area on the selected strip which is in the information-retrieval position.

2. The invention defined in claim 1 wherein:
   (a) said operating means includes a pointer movable into an indicating relation with respect to said scale means.

3. The invention defined in claim 1 wherein:
   (a) said separator means includes a strip deflecting means operative in response to a predetermined movement of said operating means;
   (b) said strip selection means includes a movable control member which controls the position of the file when said predetermined movement of said operating means occurs; and
   (c) said scale means is operatively connected to said control member for movement therewith.

4. Apparatus for retrieving a predetermined strip from a file comprised of a plurality of similar strips which are arranged in a shingled array such that an end portion of each strip in the file can be exposed, each of the strips having a plurality of information-bearing portions, said apparatus comprising:
   (a) operating means engageable with a portion of the file for moving that portion of the file, and hence the means with respect to said first path; and
   (b) separating means movable into a position intercepting the array of strips for deflecting the similar strips in the array away from the predetermined strip and directing the predetermined strip into a retrieval path, and operable by movement of said operating means;
   (c) selectively positionable means for controlling the position of the file whereat said separating means moves to intercept the array of strips;
   (d) an operational station located along said retrieval path,
   (e) a scale supported on said apparatus for movement under the influence of said selectively positionable means with respect to said first path; and
   (f) indicator means cooperating with said scale for indicating the information bearing portion of the predetermined strip which is located at said operational station.

5. The invention defined in claim 4 wherein the strips in the file each comprise information-bearing portions arranged on the strips in a predetermined format and wherein said means for indicating on said scale is arranged in a corresponding format.

6. The invention defined in claim 4 wherein said operating means is movable to selectively position the predetermined strip with respect to said operational station and includes pointer means which cooperate with said scale to indicate the information-bearing portion of the predetermined strip which is located at said operational station.

References Cited
UNITED STATES PATENTS

| | | | |
|---|---|---|---|
| 2,735,334 | 2/1956 | Emery et al. | |
| 3,142,918 | 8/1964 | Offensend et al. | 40—106.1 X |
| 3,161,105 | 12/1964 | Offensend | 40—106.1 X |
| 3,221,431 | 12/1965 | Stauffer et al. | 40—106.1 X |
| 3,354,776 | 11/1967 | Smitzer et al. | |
| 3,072,013 | 1/1963 | Pratt. | |

LOUIS R. PRINCE, Primary Examiner

DANIEL M. YASICH, Assistant Examiner

U.S. Cl. X.R.

178—17; 235—61.11; 353—26

PO-1050
(5/69)

UNITED STATES PATENT OFFICE
CERTIFICATE OF CORRECTION

Patent No. 3,473506      Dated January 26, 1970

Inventor(s) Leonard J. Seaberg

It is certified that error appears in the above-identified patent and that said Letters Patent are hereby corrected as shown below:

Column 10, line 25, please delete "means with respect to said" and substitute --file, along the--; same line, delete "and".

SIGNED AND
SEALED
JUN 16 1970

(SEAL)
Attest:

Edward M. Fletcher, Jr.
Attesting Officer

WILLIAM E. SCHUYLER, JR
Commissioner of Patents